(12) United States Patent
Kyoya

(10) Patent No.: US 7,028,227 B2
(45) Date of Patent: Apr. 11, 2006

(54) COMMUNICATION CONTROL PROGRAM, RECORDING MEDIUM CARRYING COMMUNICATION CONTROL PROGRAM, COMMUNICATION CONTROL METHOD, AND DATA PROCESSING APPARATUS

(75) Inventor: Minoru Kyoya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 888 days.

(21) Appl. No.: 09/963,717

(22) Filed: Sep. 26, 2001

(65) Prior Publication Data

US 2002/0161864 A1 Oct. 31, 2002

(51) Int. Cl.
*G06F 11/00* (2006.01)

(52) U.S. Cl. .......................... 714/49; 714/746
(58) Field of Classification Search ............ 714/49, 714/748
See application file for complete search history.

(56) References Cited

U.S. PATENT DOCUMENTS

| | | | | |
|---|---|---|---|---|
| 4,323,966 A | * | 4/1982 | Whiteside et al. | 714/1 |
| 5,291,590 A | * | 3/1994 | Ohnishi et al. | 714/49 |
| 5,459,725 A | * | 10/1995 | Bodner et al. | 370/390 |
| 5,533,034 A | * | 7/1996 | Kuwata et al. | 714/748 |
| 5,889,940 A | * | 3/1999 | Liddell et al. | 714/49 |

FOREIGN PATENT DOCUMENTS

| | | | | |
|---|---|---|---|---|
| JP | 60137158 A | * | 7/1985 | |
| JP | 61043044 A | * | 3/1986 | |
| JP | 63169848 A | * | 7/1988 | |
| JP | 01252037 A | * | 10/1989 | |
| JP | 02076427 A | * | 3/1990 | |
| JP | 02180444 A | * | 7/1990 | |
| JP | 6-90272 | | 3/1994 | |

* cited by examiner

*Primary Examiner*—Scott Baderman
*Assistant Examiner*—Gabriel L. Chu
(74) *Attorney, Agent, or Firm*—Greer, Burns & Crain, Ltd.

(57) ABSTRACT

A program recording medium recording a communication control program to be implemented in a computer including a plurality of control means for controlling data communication in a hierarchical configuration and data transfer control means for controlling data transfer among the plurality of control means. The program causes the data transfer control means to add anomaly information into data to be transferred to the plurality of control means upon detection of the anomaly indication, to send discard indication, that is the data containing the added anomaly information, at substantially the same time to the plurality of control means, and to discard the data containing the anomaly indication and data relating thereto.

6 Claims, 14 Drawing Sheets

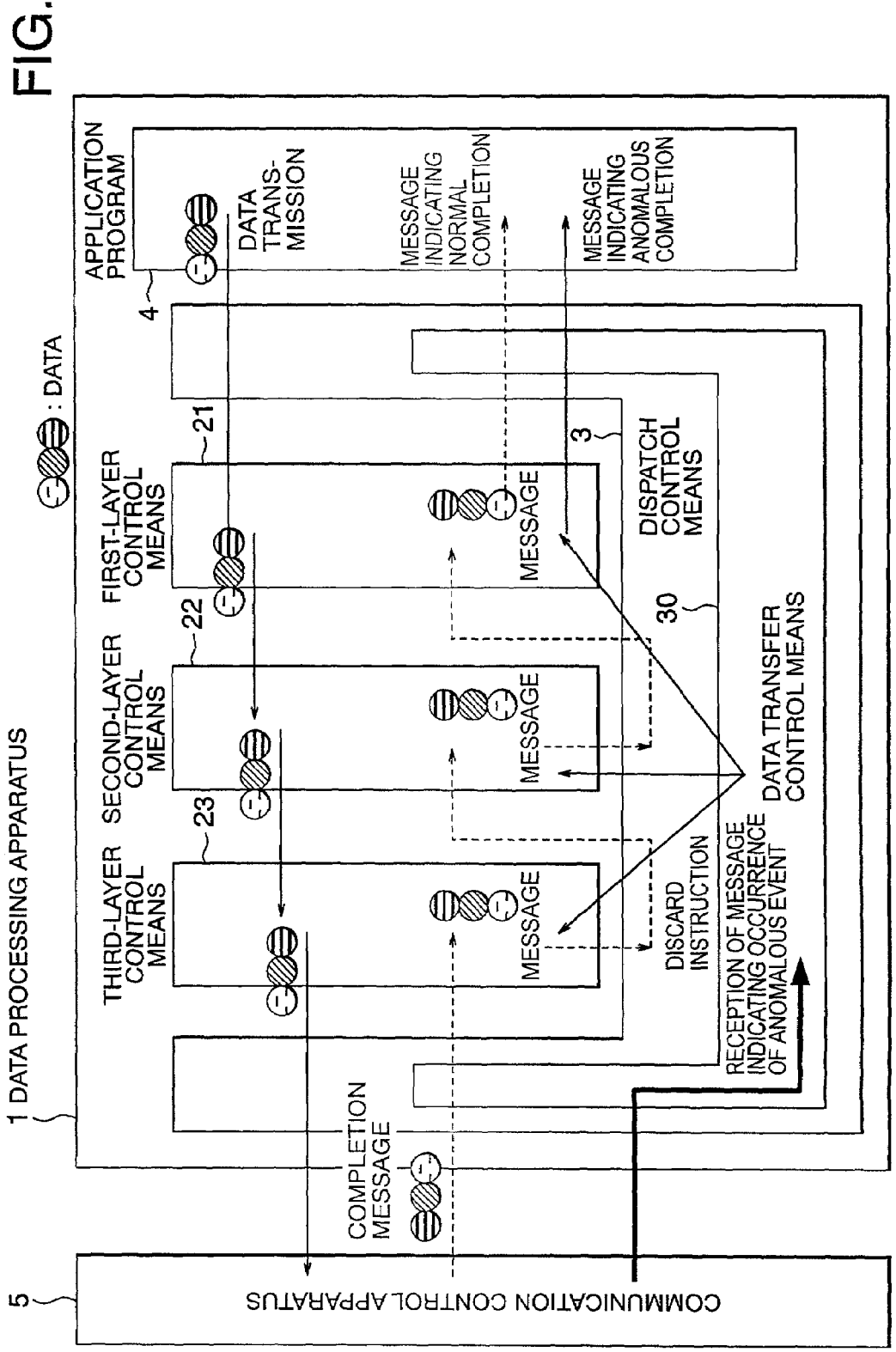

CONNECTION MANAGEMENT TABLE

COMMUNICATION CONTROL PROGRAM, RECORDING MEDIUM CARRYING COMMUNICATION CONTROL PROGRAM, COMMUNICATION CONTROL METHOD, AND DATA PROCESSING APPARATUS

BACKGROUND OF THE INVENTION

1. Field of the Invention

The present invention relates to a communication control program, and in particular, to a basic technique for data communication control utilizing a communication network such as the Internet; that is, a communication control program for performing data transfer processing in relation to communication control. Further, the present invention relates to a recording medium carrying the same, and to a communication control method and a data processing apparatus used for performing data transfer processing in relation to communication control.

Data communication products utilizing the Internet and other communication networks are expected to be provided continuously in various forms. The present invention is applied to fundamental products for data communications, such as a data communication control system, which are provided, for example, as a part of an operating system.

2. Description of the Related Art

A data communication control program performs hierarchical control. That is, at each of a plurality of layers a control means performs processing, and upon completion of the processing, the control is transferred to the control means of an adjacent layer. FIG. 12 is an explanatory diagram showing conventional data communication control. FIG. 12 shows an example configuration of a data processing apparatus 90 which performs hierarchical data communication control in three layers. The data processing apparatus 90 includes an application program 96, a first-layer control means 91, a second-layer control means 92, a third-layer control means 93, and a dispatch control means 94.

For example, when the application program 96 performs data transmission, each of the first-layer control means 91, the second-layer control means 92, and the third-layer control means 93 performs peculiar processing for the data transmission (connection). Specifically, the first-layer control means 91 receives data successively from the application program 96, performs processing to be performed at the first layer, and transmits the processed data to the second-layer control means 92, while designating the second layer as a destination. For the data received from the first-layer control means 91, the second-layer control means 92 performs processing to be performed at the second layer, and transmits the processed data to the third-layer control means 93, while designating the third layer as a destination. For the received data, the third-layer control means 93 performs processing to be performed at the third layer, and transmits the processed data to a communication control apparatus 97.

When the first-layer control means 91, the second-layer control means 92, and the third-layer control means 93 receive a completion message from the communication control apparatus 97, the third-layer control means 93, the second-layer control means 92, and the first-layer control means 91 successively perform their hierarchical controls, in this sequence, and the first-layer control means 91 for the highest layer sends to the application program 96 a message indicating normal completion or anomalous completion.

Specifically, the third-layer control means 93 receives data of a completion message from the communication control apparatus 97, performs processing of the third layer, and transfers the data to the dispatch control means 94, while designating the second-layer control means 92 as a destination of the completion-message data.

The dispatch control means 94 performs processing as shown in FIG. 13. When the dispatch control means 94 receives data from the third-layer control means 93 (step S90), the dispatch control means 94 detects an entry of the second-layer control means 92 on the basis of destination information of a data transfer control table 95 (step S91). When the entry of the second-layer control means 92 is not empty (step S92), the dispatch control means 94 queues the data to the entry (step S93), and transfers the data to the second-layer control means 92 in such manner that the leading data in the queue are transferred first (step S94). When the entry for the second-layer control means 92 is empty (step S92), the dispatch control means 94 transfers the received data to the second-layer control means 92 (step S95).

The second-layer control means 92 performs the processing of the second layer in a flow similar to that described above, and transfers the data to the first-layer control means 91. The first-layer control means 91 receives the data from the second-layer control means 92, performs the processing of the first layer, and transfers the data to the application program 96 in response to a request therefrom.

The data processing apparatus 90 performs similar processing when the data processing apparatus 90 receives from the communication control apparatus 97 data of an anomalous-completion message. Irrespective of whether the message indicates normal or anomalous completion, the dispatch control means 94 transfers the data to the first-layer control means 91, the second-layer control means 92, and the third-layer control means 93 successively on the basis of destination information. Therefore, each of the first-layer control means 91, the second-layer control means 92, and the third-layer control means 93 processes the received data at the corresponding hierarchical layer, and, only after having detected the message of an anomalous completion, discards the data under control which are entered in the respective connection management control table (not shown) and reports the anomalous completion to the upper layer.

FIG. 14 shows processing which is performed when the communication control apparatus 97 sends to the data processing apparatus 90 a message indicating occurrence of an anomalous event. The third-layer control means 93 receives data from the communication control apparatus 97 (step 100) and performs processing (step 101). When the third-layer control means 93 detects occurrence of an anomalous event (step 102), the third-layer control means 93 discards the data (step 103), and inserts an anomaly indication in data to be transmitted to the second-layer control means 92 (step 104).

Upon receipt of data from the third-layer control means 93 (step 105), the dispatch control means 94 transfers the data to the second-layer control means 92 on the basis of the data transfer control table 95 (step 106).

The second-layer control means 92 receives data from the dispatch control means 94 (step 107). When the second-layer control means 92 detects the anomalously indication (step 108) the second-layer control means 92 discards the data (step 109) and inserts an anomaly indication in data to be transmitted to the first-layer control means 91 (step 110).

Upon receipt of data from the second-layer control means 92 (step 111), the dispatch control means 94 transfers the data to the first-layer control means 91 on the basis of the data transfer control table 95 (step 112).

The first-layer control means 91 receives data from the dispatch control means 94 (step 113). When the first-layer control means 91 detects the anomalously indication (step 114), the first-layer control means 91 discards the data (step 115), and reports the occurrence of an anomalous event to the application program 96 (step 116).

In the conventional data communication control, data are processed by the control means of each layer, and resultant data are transferred to the control means of the next layer. When an anomalous event occurs during such data processing, waiting processing is performed, so that the data communication (connection) does not end until the end of data discard at the control means at the respective layers. Therefore, a new data communication to be performed by use of the same environment is placed in a wait status.

The conventional data communication control program performs hierarchical control in such a manner that data are processed by the control means of each layer and the processed data are transferred to the next layer. Therefore, even when an anomalous event occurs, a single communication does not end completely, unless the occurrence of an anomalous event is reported sequentially to all the layers for allowing the control means of the respective layers to perform processing for coping with the anomalous event. Accordingly, until the communication ends completely, a new communication to be performed by use of the same environment cannot be started.

Moreover, as to data communications having the same connection ID, reliability is considered to decrease as a result of the unstable communication environment.

Since exchange of data is performed a plurality of times in a single connection, when an anomalous event occurs in the course of the communication, some of the data exchanged in the connection have already been transferred to the upper layer. Therefore, when an anomalous event occurs, all the data, including the data having already been transferred to the upper layer, must be discarded so as to enable acceptance of a new event.

A specific example of data communications will now be described. In a banking system, the database of a host is not updated each time transaction data (deposit, withdrawal, transfer) to be recorded are produced at a terminal, such as an ATM. Instead, such transaction data are stored in, for example, a means server during the daytime, and are transferred to the database of the host, through communication with the host, during the nighttime. In an example case in which a host of a bank A communicates with hosts of banks B and C, the host of bank A sets different connections for the hosts of banks B and C, respectively, and communicates therewith in order to exchange the transaction data between the hosts. Such data transfer cannot be performed during the daytime, and therefore is performed at night in a collective manner. Therefore, when an error occurs in data communication control, quick recovery is required.

However, the conventional data communication control scheme in which the control means of each layer awaits completion of processing of the previous layer is of low efficiency. Further, unless data discard is completed, a new event cannot be accepted, and therefore communications suffer delay.

SUMMARY OF THE INVENTION

An object of the present invention is to provide a communication control program to cause a computer to send almost simultaneously data discard indication, that is a message containing anomaly information, to control means of respective hierarchical layers and to discard data under own control in order to complete data recovery processing within a shortened period of time.

Another object of the present invention is to provide a program recording medium recorded a communication control program to cause a computer to send almost simultaneously data discard indication, that is a message containing anomaly information, to control means of respective hierarchical layers and to discard data under own control in order to complete data recovery processing within a shortened period of time.

Still, another object of the present invention is to provide a communication control method comprising the step of sending almost simultaneously data discard indication, that is a message containing anomaly information, to control means of respective hierarchical layers and discarding data under own control in order to complete data recovery processing within a shortened period of time.

Further, another object of the present invention is to provide a data processing apparatus comprising of means for sending almost simultaneously data discard indication, that is a message containing anomaly information, to control means of respective hierarchical layers and means for discarding data under own control in order to complete data recovery processing within a shortened period of time.

The present invention provides a communication control program to be implemented in a computer including a plurality of control means for controlling data communication in a hierarchical configuration and data transfer control means for controlling data transfer among the plurality of control means for controlling data communication, wherein the program causes the computer to perform anomaly judgment processing to judge whether received data contain an anomaly indication indicating occurrence of an anomalous event and upon detection of the anomaly indication, to add anomaly information into data to be transferred to the plurality of control means for controlling data communication, in the data transfer control means for controlling data transfer; and discard instruction processing to send the data containing the added anomaly information at substantially the same time to the plurality of control means for controlling data communication or to the plurality of control means for controlling data communication other than the control means for controlling data communication which has transmitted the data containing the anomaly indication, in the data transfer control means for controlling data transfer.

Further, the present invention provides a program recording medium recording a communication control program to be implemented in a computer including a plurality of control means for controlling data communication in a hierarchical configuration and data transfer control means for controlling data transfer among the plurality of control means for controlling data communication, wherein the program causes the computer to perform anomaly judgment processing to judge whether received data contain an anomaly indication indicating occurrence of an anomalous event, and upon detection of the anomaly indication, to add anomaly information into data to be transferred to the plurality of control means for controlling data communication, in the data transfer control means for controlling data transfer; and discard instruction processing to send the data containing the added anomaly information at substantially the same time to the plurality of control means for controlling data communication or to the plurality of control means for controlling data communication other than the control means for controlling data communication which has transmitted the data containing the anomaly indication, in the data transfer control means for controlling data transfer.

Further, the present invention provides a communication control method performed in a computer including a plurality of control means for controlling data communication in a hierarchical configuration and data transfer control means for controlling data transfer among the plurality control means for controlling data communication, wherein the method comprising the steps of judging whether received data contain an anomaly indication indicating occurrence of an anomalous event, in the data transfer control means for controlling data transfer; adding, upon detection of the anomaly indication, anomaly information into data to be transferred to the plurality of control means for controlling data communication, in the data transfer control means for controlling data transfer; and sending the data containing the added anomaly information at substantially the same time to the plurality of control means for controlling data communication or to the plurality of control means for controlling data communication other than the control means for controlling data communication which has transmitted the data containing the anomaly indication, in the data transfer control means for controlling data transfer.

Further the present invention provides a data processing apparatus comprising a plurality of control means for controlling data communication in a hierarchical configuration; and data transfer control means for controlling data transfer among the plurality of control means for controlling data communication, wherein the data transfer control means further comprising anomaly judgment means for judging whether received data contain an anomaly indication indicating occurrence of an anomalous event; anomaly setting means for adding, upon detection of the anomaly indication, anomaly information into data to be transferred to the plurality of control means for controlling data communication; and discard instruction means for sending the data containing the added anomaly information at substantially the same time to the plurality of control means for controlling data communication or to the plurality of control means for controlling data communication other than the control means for controlling data communication which has transmitted the data containing the anomaly indication.

In the present invention, when communication control is normal, the same processing as that performed in the conventional apparatus is performed. However, when occurrence of an anomalous event is detected, the data transfer control means can detect the occurrence of an anomalous event and can simultaneously notify the control means of the respective layers of the occurrence of an anomalous event. Therefore, the control means of the respective layers can perform the data discard processing. Moreover, since the control means of the respective layers can perform data discard processing without waiting for each other, a new data communication using the same communication environment can be started quickly.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 is a diagram schematically showing processing according to an embodiment of the present invention;

DESCRIPTION OF THE PREFERRED EMBODIMENTS

Figure 2A:
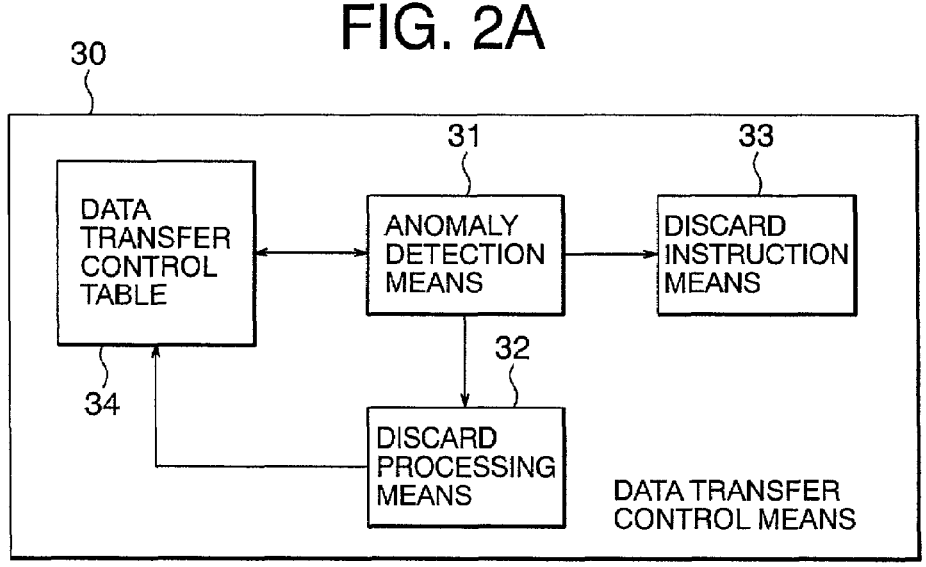
FIG. 2A is a block diagram showing an example configuration of a data transfer control means in the embodiment.

An embodiment of the present invention will now be described with reference to the drawings.

In the present embodiment, as shown in FIG. 1, data communication (connection) between an application program 4 and a communication control apparatus 5 is controlled by means of three-layer hierarchical control. Notably, the number of layers of the hierarchical communication control is not limited to 3, and may be changed insofar as a plurality of hierarchical layers are configured.

A data processing apparatus 1 is connected to the communication control apparatus 5 and includes a first-layer control means 21, a second-layer control means 22, a third-layer control means 23, a dispatch control means 3, and the application program 4.

The application program 4 is a program for business processing utilizing data communication. The communication control apparatus 5 is an apparatus for performing data communication control, to thereby enable the data processing apparatus 1 to perform data communications while establishing connection with an external communication network or any other suitable communication means.

The dispatch control means 3 serves as means for controlling job allocation within the data processing apparatus 1 and includes a data transfer control means 30. The data transfer control means 30 serves as means for controlling data transfer among the control means 21 to 23 of the respective layers, by use of a data transfer control table 34.

FIG. 2A shows an example configuration of the data transfer control means 30. The data transfer control means 30 includes an anomaly detection means 31, a discard processing means 32, and a discard instructing means 33. The anomaly detection means 31 judges whether data received from the communication control apparatus 5 or the control means 21 to 23 contain an anomaly indication. The discard processing means 32 discards data queued in the entry of the data transfer control table 34 of the data transfer control means 30. The discard instruction means 33 sends a discard instruction (i.e., data including the anomaly indication) to the control means 21 to 23 of the respective layers simultaneously.

Figure 2B:
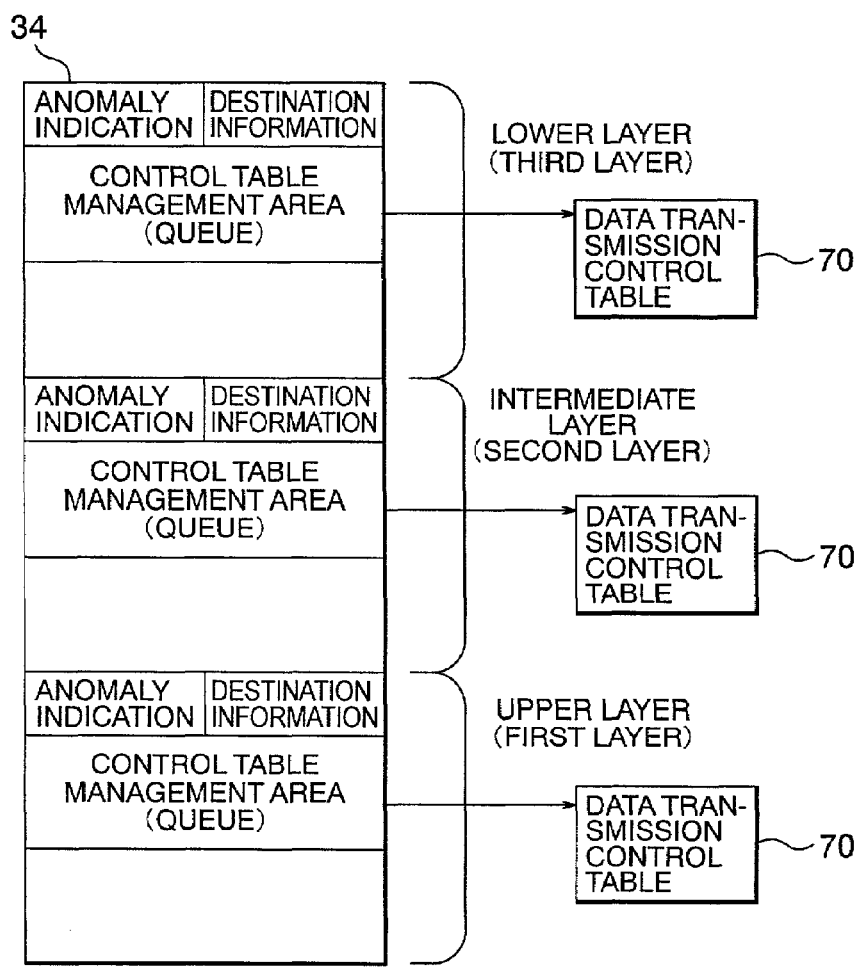
FIG. 2B is a diagram showing an example of a data transfer control table used in the embodiment.

FIG. 2B shows an example of the data transfer control table 34. For each layer, the data transfer control table 34 has a destination information area and a control table management area. When the data transfer control means 30 receives a message, with reference to the anomaly indication set in the data transfer control table 34, the data transfer control means 30 issues a discard instruction. The control table management area of the data transfer control table 34 is used for queuing a data transmission control table 70 which is designated for transfer to the upper layer. When the data transfer control means 30 receives a message indicating occurrence of an anomalous event, the data transfer control means 30 discards data queued in the corresponding control table management area of the data transfer control table 34.

The data transfer control table 34 shown in FIG. 2B has three layers (layer 3, layer 2, and layer 1). However, since the number of layers within the data processing apparatus 1 is determined at the time of the system being designed, the number of entries of the data transfer control table 34 is determined in accordance with the design details such that the number of entries becomes equal to the number of layers.

Figure 3A:
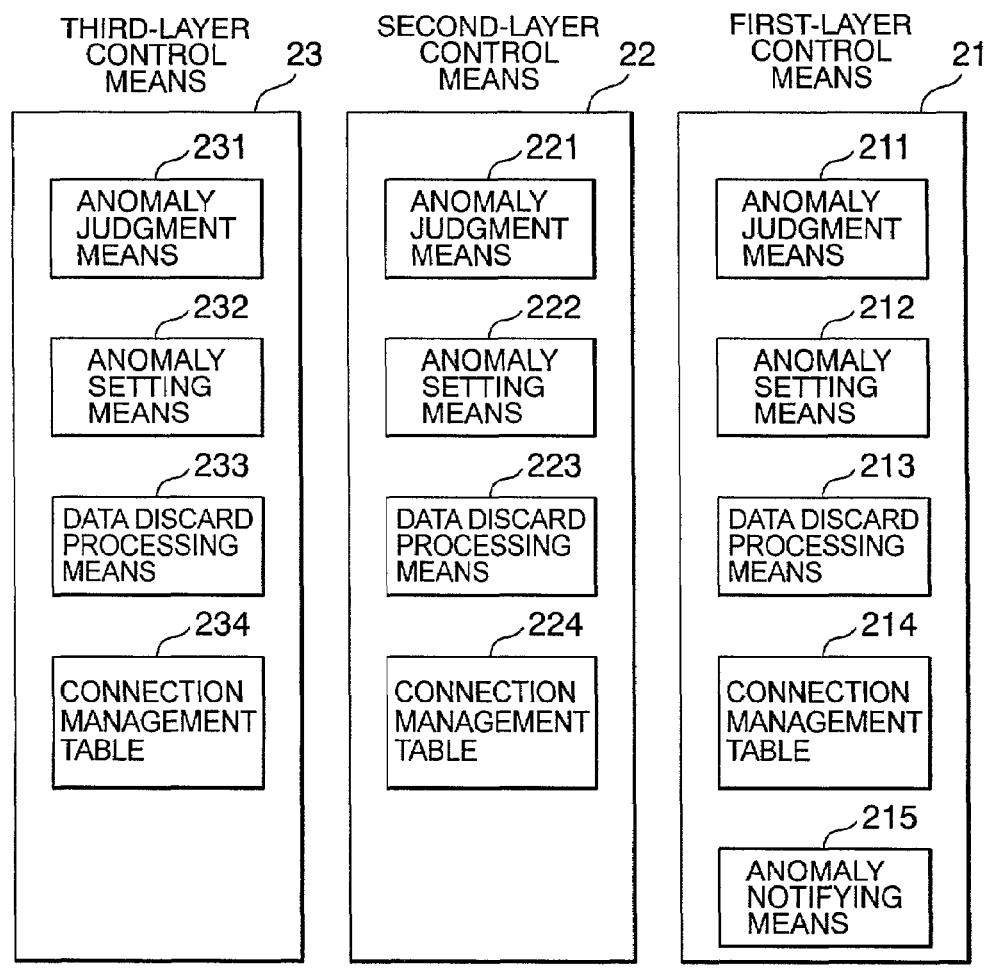
FIG. 3A is a block diagram showing example configurations of control means of respective hierarchical layers in the embodiment.

The control means 21 to 23 of the data processing apparatus 1 form a hierarchical configuration and each serves as means for performing communication control for a corresponding layer. FIG. 3A shows example configurations of the control means 21, 22, and 23. The first-layer control means 21 includes an anomaly judgment means 211, an anomaly setting means 212, a data discard processing means 213, a connection management table 214, and an anomaly notifying means 215. The second-layer control means 22 includes an anomaly judgment means 221, an anomaly setting means 222, a data discard processing means 223, and a connection management table 224. The third-layer control means 23 includes an anomaly judgment means 231, an anomaly setting means 232, a data discard processing means 233, and a connection management table 234.

Each of the anomaly judgment means 211, 221, and 231 detects an anomalous event that occurs in the course of performance of the control of the corresponding layer, as well as a message transferred from a previous stage and indicating occurrence of an anomalous event. Each of the anomaly setting means 212, 222, and 232 inserts, upon detection of an anomalous event, an anomaly indication in data to be transferred to the control means of another layer. Each of the data discard processing means 213, 223, and 233 discards, upon detection of an anomalous event, data of a connection having suffered from the anomalous event, which are queued in the entries of the corresponding connection management table 214, 224, or 234. When an anomalous event occurs, the anomaly notifying means 215, provided in the highest layer; i.e., in the first-layer control means 21, reports occurrence of the anomalous event to the application program 4.

Figure 3B:
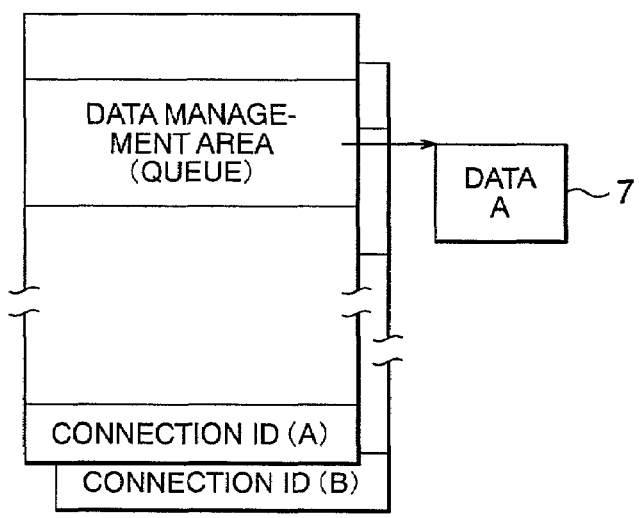
FIG. 3B is a diagram showing an example of a connection management/control table used in the embodiment.

FIG. 3B shows example connection management tables 214, 224, and 234 managed in the control means 21, 22, and 23. The data management area (queue) of each of the connection management tables 214, 224, and 234 is used for queuing data 7 to be transferred to the upper layer.

Since a plurality of connections are present, the control means of each layer creates the connection management table 214, 224, or 234 for each connection, and searches a connection management table corresponding to a connection ID.

Figure 4:
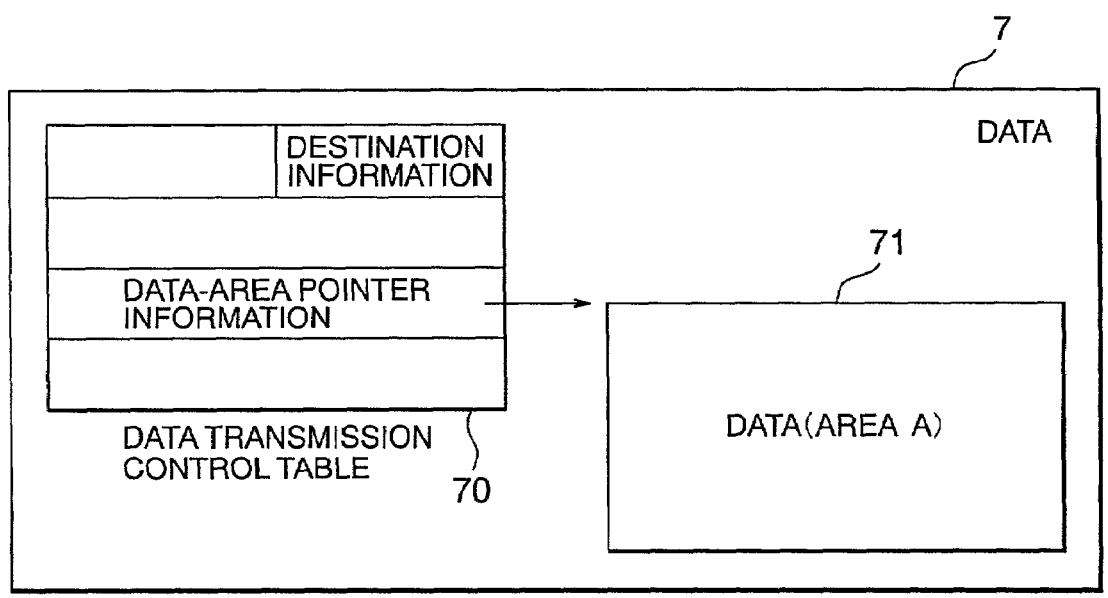
FIG. 4 is a diagram showing example data to be transferred from the control means to the data transfer control means.

The data 7 shown in FIG. 4 are composed of a data transmission control table 70 and data 71. The data transmission control table 70 includes at least a destination information area and a data-area pointer information area. Identification information of the control means 21, 22, or 23 is set in the destination information area as a data transmission destination. Positional information, such as an address of a data region A in which the data 71 are stored, is set in the data-area pointer information area. When an anomalous event occurs in the control means 21, 22, or 23, an anomaly indication is set in the data transmission control table 70. Notably, when an anomalous event occurs, only the data transmission control table 70 is sent out as the data 7.

When the application program 4 performs data transmission, if communication control is performed normally or properly, the data processing apparatus 1 performs the same processing as that performed in a conventional data processing apparatus.

When the first-layer control means 21 receives data from the application program 4 via the dispatch control means 3, the first-layer control means 21 processes the data and transmits the processed data to the second-layer control means 22. The second-layer control means 22 performs second-layer processing for the received data and transmits the processed data to the third-layer control means 23. The third-layer control means 23 performs third-layer processing for the received data and transmits the processed data to the communication control apparatus 5 via the dispatch control means 3. After completion of data transmission, the communication control apparatus 5 transmits to the data processing apparatus 1 data (completion message) to be transferred to the application program 4. The third-layer control means 23 receives the data (completion message) from the communication control apparatus 5 via the dispatch control means 3 and processes the received data. Subsequently, the third-layer control means 23 transmits to the dispatch control means 3 a completion message directed to the second-layer control means 22. The data transfer control means 30 of the dispatch control means 3 transfers the received completion message to the second-layer control means 22 on the basis of the data transfer control table 34. In a similar manner, the data (completion message) are transferred from the second-layer control means 22 to the first-layer control means 21, and the first-layer control means 21 transmits the data (completion message) to the application program 4.

However, when communication control for data transmission from the application program 4 fails or when a anomalous event is occurred through a course of data communication, the communication control apparatus 5 transmits to the data processing apparatus 1 an anomaly message to be transferred to the application program 4. The data transfer control means 30 of the dispatch control means 3 detects occurrence of an anomalous event on the basis of data (anomaly message) from the communication control apparatus 5, discards the data regarding the connection and entered in the data transfer control table 34, and transmits data (discard instruction) containing an anomaly indication to the control means 21 to 23 of the respective layers simultaneously. Upon receipt of the data (discard instruction), the control means 21 to 23 discard the data queued in the entries of the connection management tables 214, 224, and 234. Further, the first-layer control means 21 at the highest layer transmits data (a message indicating anomalous completion) to the application program 4.

Only the case where the data processing apparatus 1 has received an anomaly message for data transmission has been described with reference to FIG. 1. However, apart from the case of an anomaly message being received from the communication control apparatus 5, the data transfer control means 30 performs similar processing for the case in which an anomalous event occurs in relation to data or a message or the case in which an anomalous event occurs in relation to the processing performed in the control means 21 to 23 and data received from the control means 21 to 23 contains an anomaly indication.

Next, the processing according to the present embodiment will be described in more detail.

Figure 5:
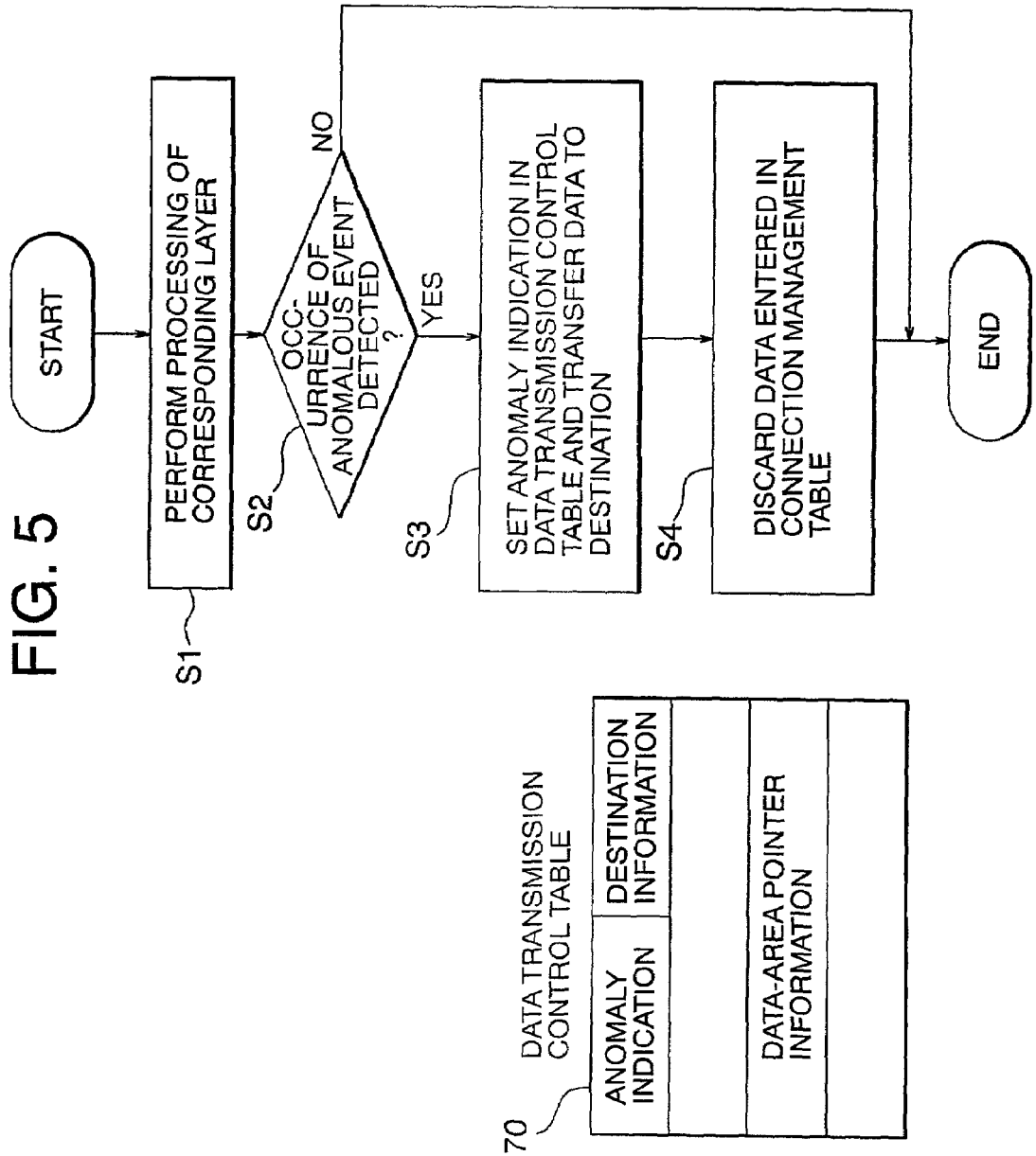
FIG. 5 is a flowchart showing processing performed by the control means of each hierarchical layer.

FIG. 5 is a flowchart showing processing performed by the control means of each hierarchical layer. Each of the control means 21 to 23 receives data 7 from the communication control apparatus 5 or the control means of another layer via the data transfer control means 30 and performs processing to be performed at the corresponding layer (step S1). Each of data sets A to C serving as the data 7 is composed of a data transmission control table 70 and data 71 as shown in FIG. 4.

Figure 6:
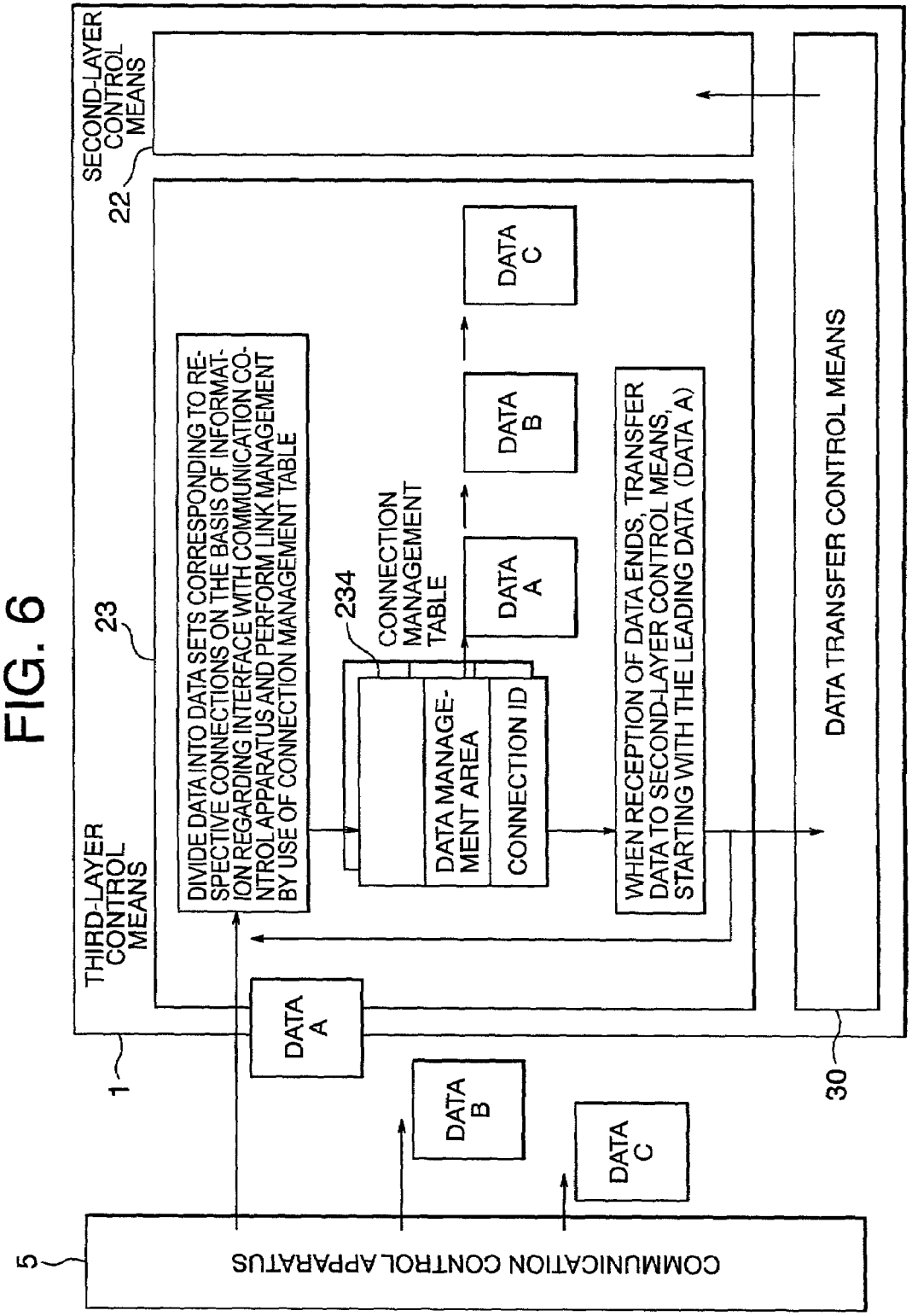
FIG. 6 is a block diagram showing processing performed by the third-layer control means.

FIG. 6 is a block diagram showing processing performed by the third-layer control means 23. In the third-layer control means 23, on the basis of information regarding interface with the communication control apparatus 5, data are divided into data sets corresponding to respective connections, and the data sets are subjected to link management performed by use of the connection management table 234. Upon successive receipt of the data sets A, B, and C from the communication control apparatus 5, the third-layer control means 23 queues the data sets A, B, and C in the corresponding data management area of the connection management table 234. Upon completion of receipt of data, the third-layer control means 23 transfers the data sets A, B, and C, in this sequence, to the second-layer control means 22. That is, the third-layer control means 23 writes in the destination information area of the data transmission control table 70 data indicating that the second-layer control means 22 is a destination. Subsequently, the third-layer control means 23 transfers the data to the data transfer control means 30.

Figure 7:
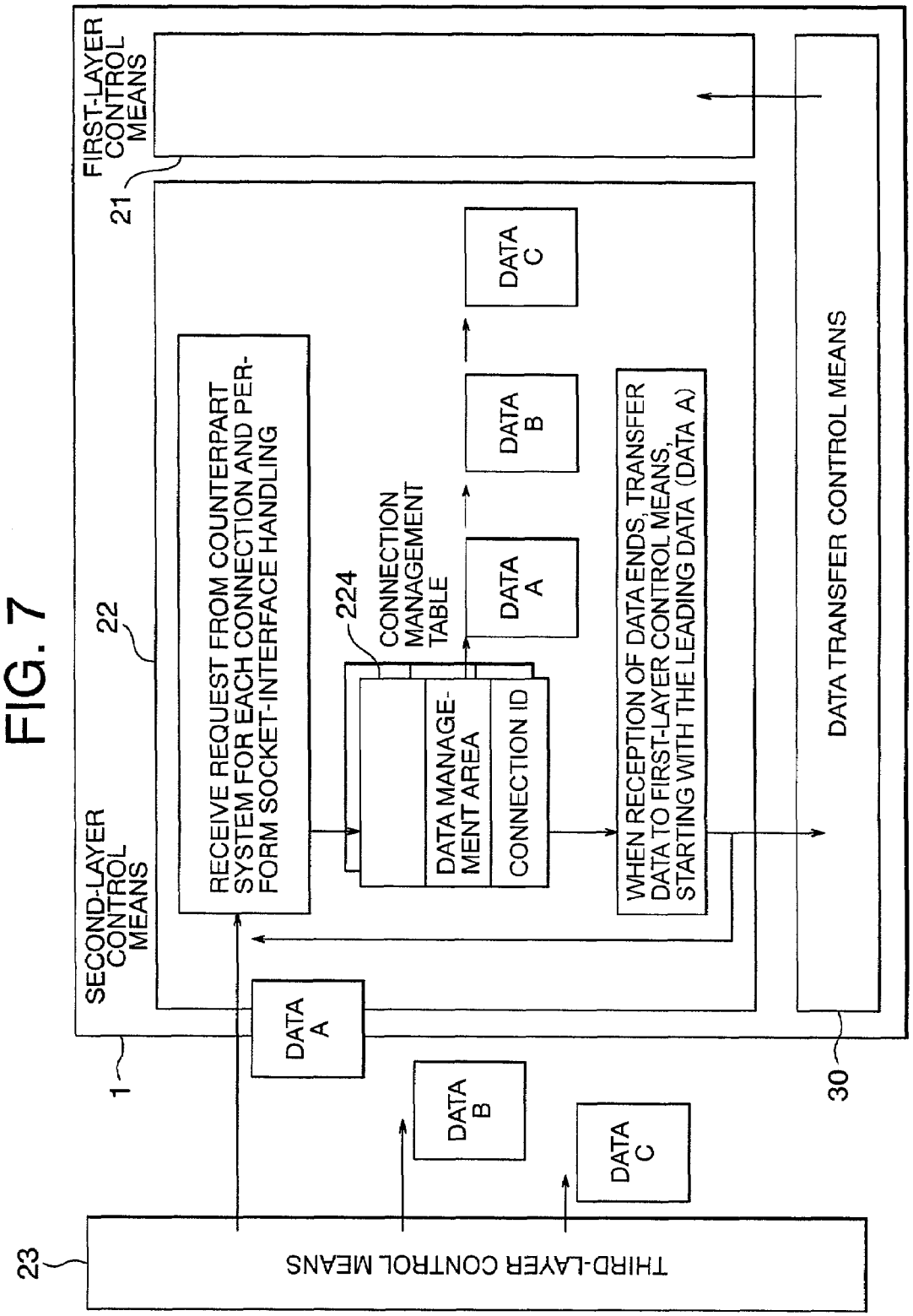
FIG. 7 is a block diagram showing processing performed by the second-layer control means.

FIG. 7 is a block diagram showing processing performed by the second-layer control means 22. The second-layer control means 22 receives a request from a counterpart system (the third-layer control means 23) for each connection, and performs socket-interface handling. As described in relation to the processing at the third-layer control means 23, the second-layer control means 22 successively processes the received data sets A, B, and C on the basis of the connection management table 224, and then transfers them to the first-layer control means 21 via the data transfer control means 30.

Figure 8:
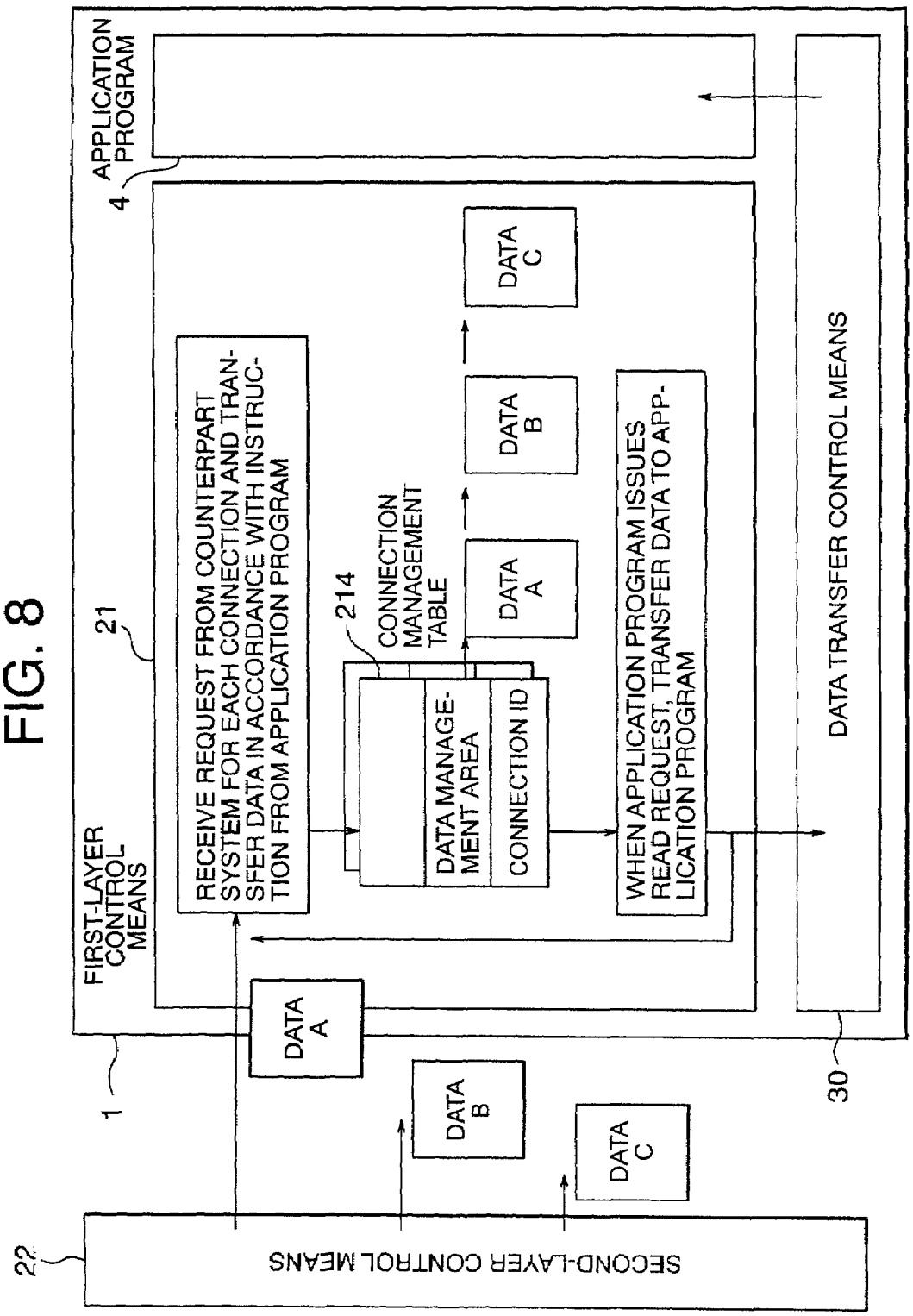
FIG. 8 is a block diagram showing processing performed by the first-layer control means.

FIG. 8 is a block diagram showing processing performed by the first-layer control means 21. The first-layer control means 21 receives a request from a counterpart system (the second-layer control means 22) for each connection, and transfers data in accordance with an instruction from the application program 4. As described in relation to the processing at the third-layer control means 23, when the first-layer control means 21 receives a READ request issued from the application program 4, on the basis of the connection management table 214, the first-layer control means 21 transfers the data sets A, B, and C, in this sequence, to the application program 4 via the data transfer control means 30.

As described above, each of the control means 21 to 23 performs processing to be performed at the corresponding layer (FIG. 5: step S1). When the control means 21, 22, or 23 detects occurrence of an anomalous event from the data transmission control table 70 of the received data (step S2), the control means 21, 22, or 23 sets an anomaly indication in the data transmission control table 70 of the processed data 7 and transfers the data 7 to a destination (step S3), and discards the data entered in the data management area of the corresponding connection management table 214, 224, or 234 (step S4).

Figure 9:
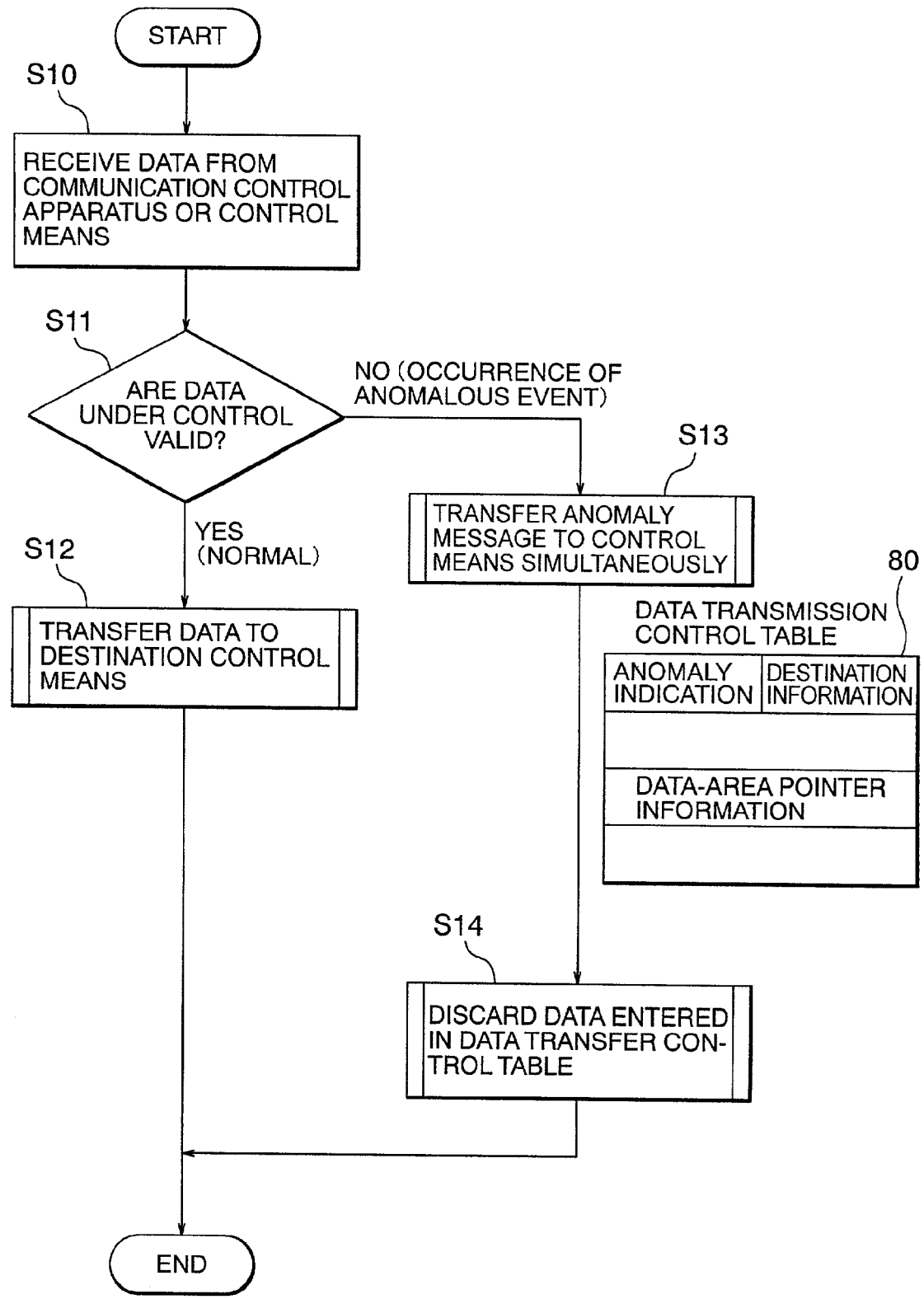
FIG. 9 is a flowchart showing processing performed by the data transfer control means.

FIG. 9 is a flowchart showing processing performed by the data transfer control means 30. When the data transfer control means 30 receives from the communication control apparatus 5 in a previous stage or any of the control means 21 to 23 (step S10), the data transfer control means 30 judges whether the data under control are valid (step S11). When the data received from the communication control apparatus 5 are a message indicating occurrence of an anomalous event, or when the data transmission control table 70 of the data transferred from any of the control means 21 to 23 include an anomaly indication, the data transfer control means 30 judges that the data under control are invalid. When the data under control are valid (normal state), the data transfer control means 30 transfers the data to one of the control means 21 to 23 (i.e., a control means designated as a destination) in accordance with the data transfer control table 34 (step S12). When the data under control are invalid (anomalous state), the data transfer control means 30 transmits an anomaly message to the control means 21 to 23 simultaneously (step S13).

Figure 10:
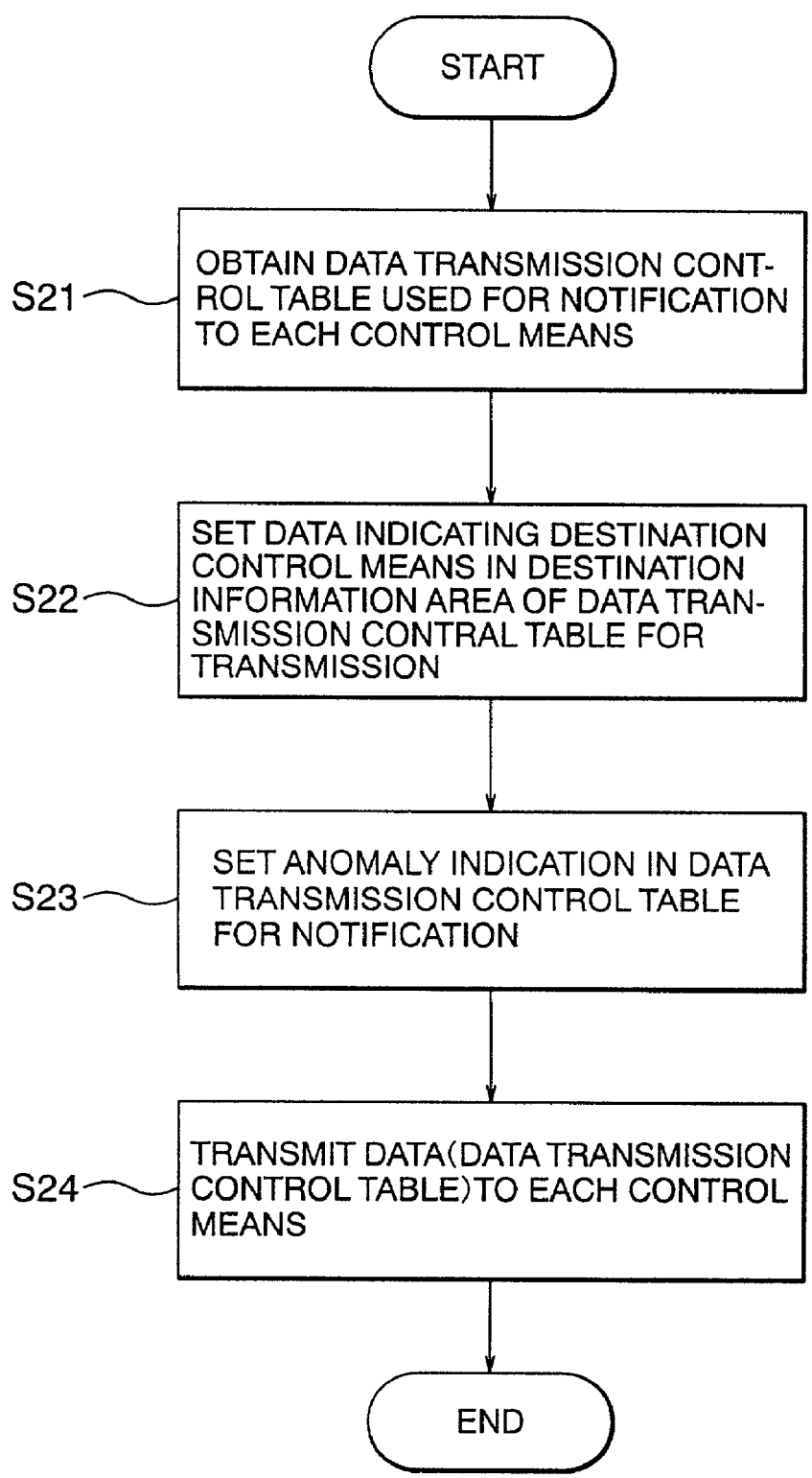
FIG. 10 is a flowchart showing the processing performed at step S13 shown in FIG. 9.

FIG. 10 is a flowchart showing the processing performed at step S13 shown in FIG. 9. The data transfer control means 30 obtains a data transmission control table 80 (FIG. 9) used for transmission to the control means 21 to 23 (step S21), and writes in the destination information area of the data transmission control table 80 data indicating designation of one of the control means 21 to 23 as a destination (step S22). Further, the data transfer control means 30 sets an anomaly indication in the data transmission control table 80 (step S23) and transmits the data (the data transmission control table 80) to the designated one of the control means 21 to 23 (step S24). The data (the data transmission control table 80) are transmitted to all the control means 21 to 23. However, the present embodiment may be modified in such a manner that when the data transfer control means 30 detects occurrence of an anomalous event on the basis of data transferred from a certain one of the control means 21 to 23, the data containing the data transmission control table 80 are transmitted to the control means other than the certain control means.

The data transfer control means 30 discards the data queued in the entries of the data transfer control table 34 (step S14). Notably, the processing of step S14 may be performed before the processing of step S13.

When the control means 21, 22, or 23 detects occurrence of an anomalous event from the data transmission control table 80 received from the data transfer control means 30 (FIG. 5: step S2), the control means 21, 22, or 23 discards the data entered in the data management area of the corresponding connection management table 214, 224, or 234 (FIG. 5: step S4).

Figure 11:
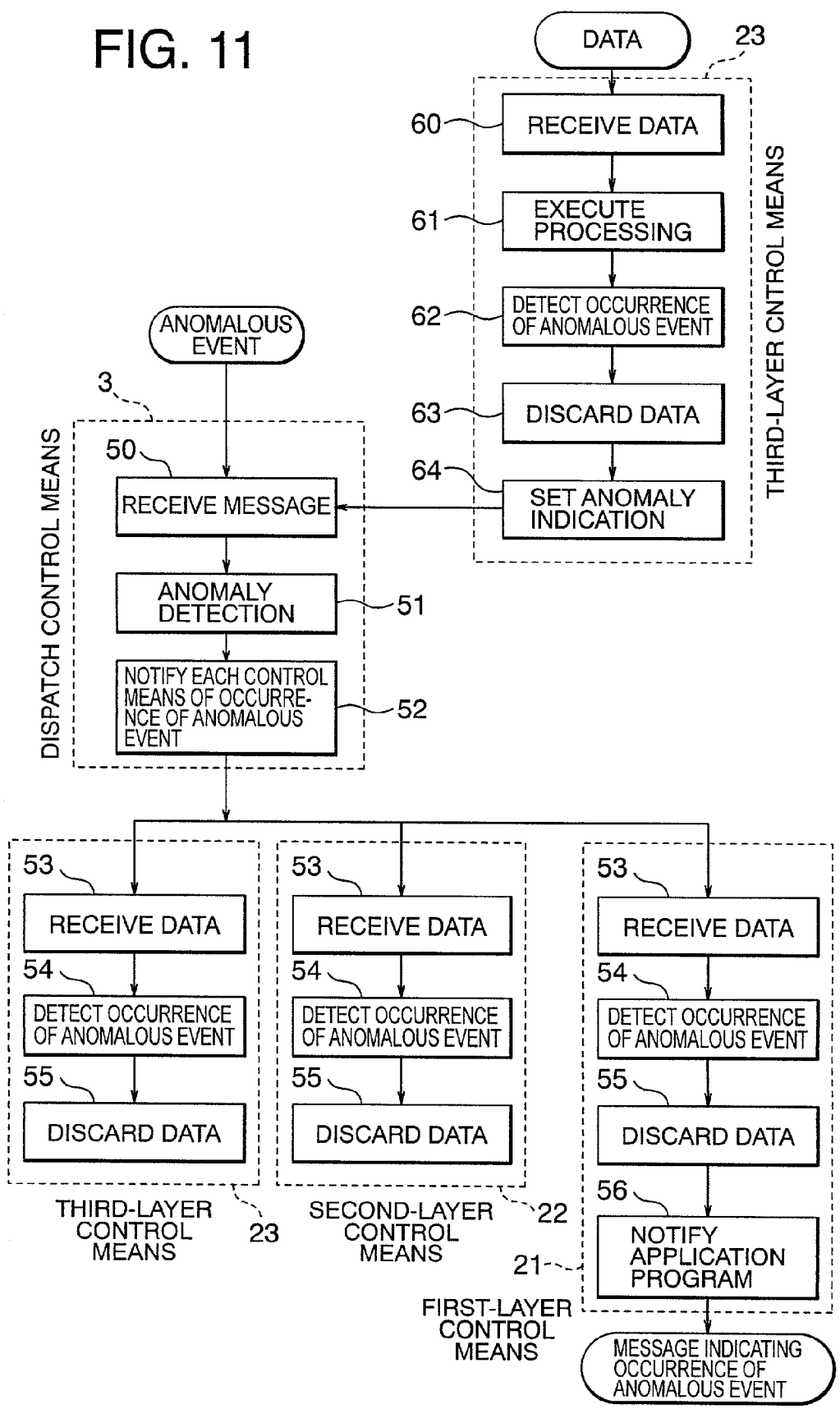
FIG. 11 shows a diagram showing the flow of processing performed upon occurrence of an anomalous event in the present invention.
Figure 12:
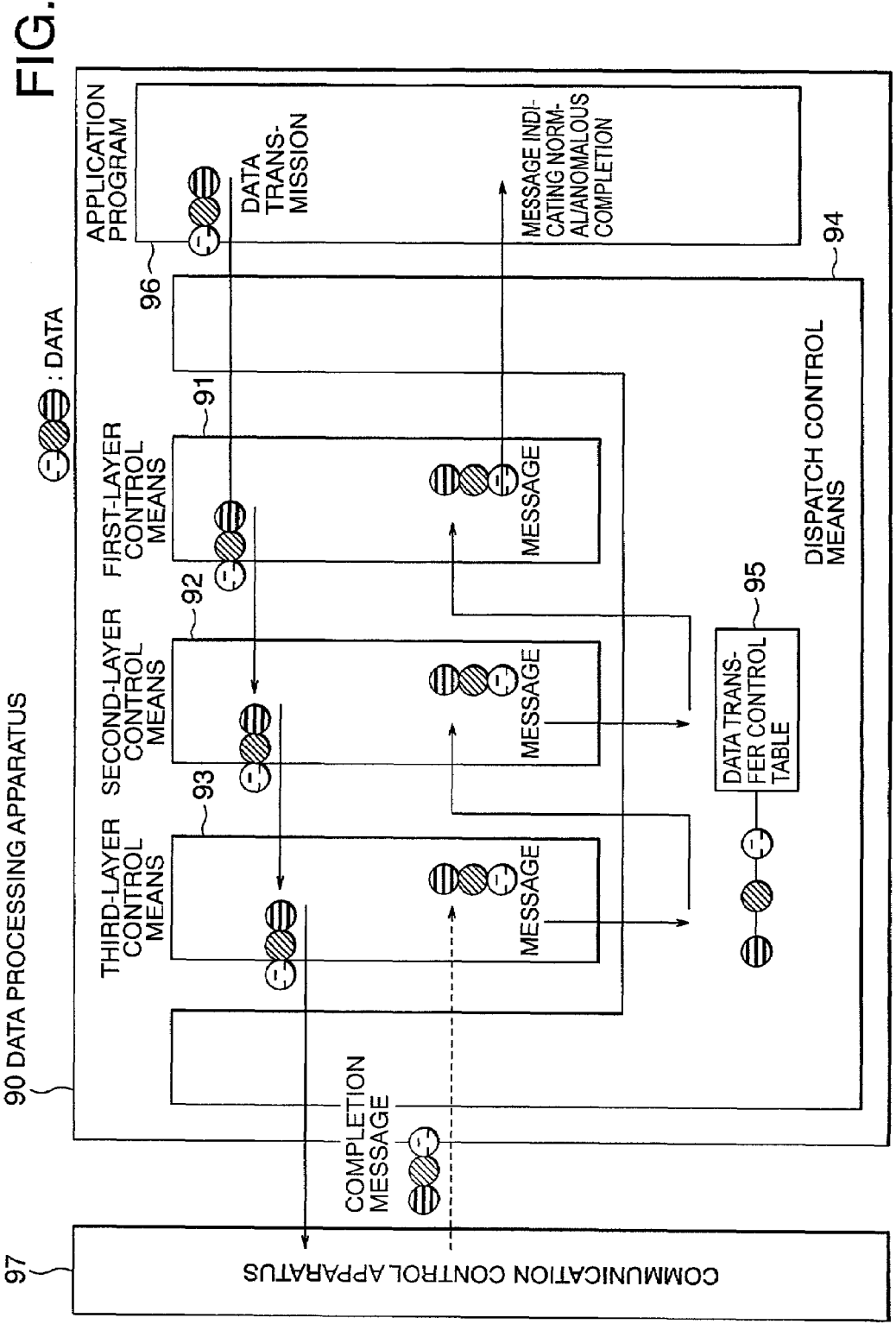
FIG. 12 is a diagram showing conventional communication control.
Figure 13:
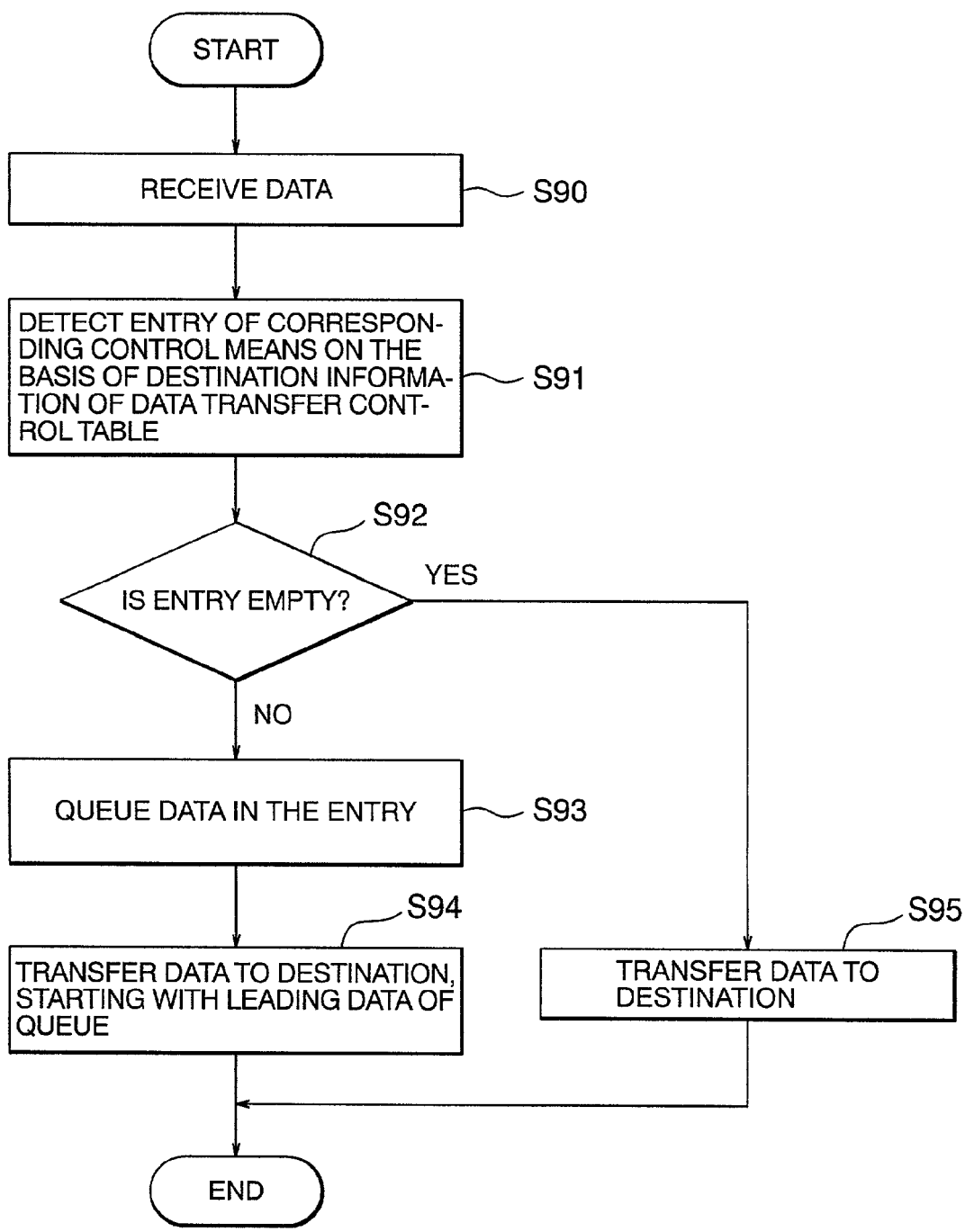
FIG. 13 is a flowchart showing processing for conventional data transfer control.

As shown in FIG. 11, in the present invention, when the dispatch control means 3 receives data containing an anomaly indication (step 50) and detects occurrence of an anomalous event (step 51), the dispatch control means 3 transmits data containing an anomaly indication (anomaly message) to the control means 21 to 23 of the respective layers simultaneously (step 52). The control means 21 to 23 receive substantially in parallel the data containing an anomaly indication (anomaly message) transmitted from the dispatch control means 3 without waiting for each other (step 53), and detect occurrence of an anomalous event (step 54) from the data. Subsequently, each of the control means 21 to 23 discards the data under own control (step 55). Moreover, the first-layer control means 21 (the control means at the highest layer) reports the occurrence of an anomalous event to the application program 4 (step 56).

Figure 14:
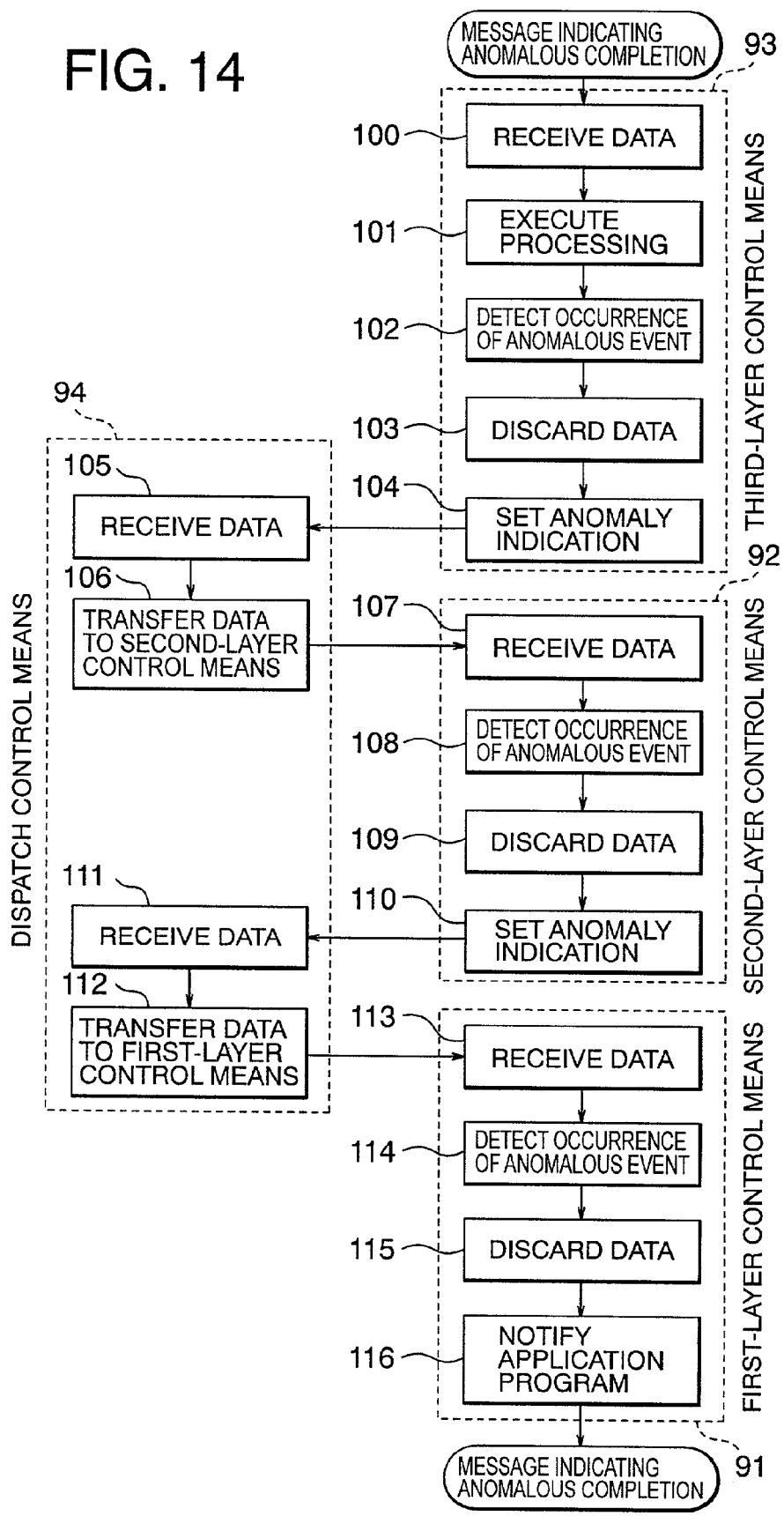
FIG. 14 is a diagram showing the flow of processing performed upon occurrence of an anomalous event in a conventional apparatus.

As shown in FIG. 14, in the conventional apparatus, when an anomalous event occurs, the control means of the respective layers detect the occurrence of an anomalous event successively and discard data. By contrast, in the present invention, the dispatch control means detects the occurrence of an anomalous event, and the control means of the respective layers receive an anomaly message substantially at the same time and perform data discard processing. Therefore, the data discard processing can be completed more quickly as compared with the case of the conventional apparatus, and a new data communication using the same communication environment can be started without any delay.

The program realizing the respective means of the present invention can be stored on a proper computer-readable recording medium such as transportable memory, semiconductor memory, or hard disk drive, and is provided in a state in which the program is recorded on the recording medium. Alternatively, the program of the present invention can be provided by means of data transmission performed via communication interfaces and various communication networks.

Obviously, numerous modifications and variations of the present invention are possible in light of the above teachings. It is therefore to be understood that within the scope of the appended claims, the present invention may be practiced otherwise than as specifically described herein.

What is claimed is:

1. A computer readable medium storing a program to cause a computer to execute a plurality of hierarchical control processes which are configured as a hierarchy of data communication processes and for individually performing the hierarchical control process corresponding to a level of the hierarchical data communication processing, and a data transfer control process for controlling data transfer among the plurality of hierarchical control processes, the program causing the computer to execute:

in each of the hierarchical control processes,
accessing connection management information stored in a predetermined memory area to manage data to be processed in a connection of data communication processing;
detecting an anomalous event in data during a data communication process;
setting another hierarchical control as a destination of transmitting the data and an anomaly indication in data transmission information when an anomalous event is detected in the data communication process;
sending the data transmission information including the destination and the anomaly indication to the data transfer control process;
detecting whether or not an anomaly indication is included in a data transmission information received from the data transfer control process, and
when the anomaly indication is detected in the received data transmission information, discarding data which is to be processed in the connection corresponding to the data transmission information in which the anomaly indication is detected; and in the data transfer control process,
storing data transmission control information on the basis of the data transmission information received from the hierarchical control processes;
detecting whether or not the anomaly indication is included in the received data transmission information;
setting an anomaly indication in data transmission information when the anomaly indication is detected in the received data transmission information; and
simultaneously transmitting the data transmission information to the hierarchical control processes except for the hierarchical control process in which a first data transmission information was sent to the data transfer control process.

2. The computer readable medium according to claim 1, wherein the program causes the computer to execute:
in the data transfer control process,
when the anomaly indication is detected in the received data transmission information, discarding the data to be processed and data transmission control information corresponding to the connection in which the anomalous event is detected.

3. A communication control method to cause a computer to execute a plurality of hierarchical control processes which are configured as a hierarchy of data communication processes and for individually performing the hierarchical control process corresponding to a level of the hierarchical data communication processing, and a data transfer control process for controlling data transfer among the plurality of hierarchical control processes, the method comprising the steps of:

in each of the hierarchical control processes,
accessing connection management information stored in a predetermined memory area to manage data to be processed in a connection of data communication processing;
detecting an anomalous event in data during a data communication process;
setting another hierarchical control as a destination of transmitting the data and an anomaly indication in data transmission information when an anomalous event is detected in the data communication process;
sending the data transmission information including the destination and the anomaly indication to the data transfer control process;
detecting whether or not an anomaly indication is included in a data transmission information received from the data transfer control process, and
when the anomaly indication is detected in the received data transmission information, discarding data which is to be processed in the connection corresponding to the data transmission information in which the anomaly indication is detected; and in the data transfer control process,
storing data transmission control information on the basis of the data transmission information received from the hierarchical control processes;
detecting whether or not the anomaly indication is included in the received data transmission information;

setting an anomaly indication in data transmission information when the anomaly indication is detected in the received data transmission information; and simultaneously transmitting the data transmission information to the hierarchical control processes except for the hierarchical control process in which a first data transmission information was sent to the data transfer control process.

4. A communication control method according to claim 3, wherein:

in the data transfer control process, when the anomaly indication is detected in the received data transmission information, discarding the data to be processed and data transmission control information corresponding to the connection in which the anomalous event is detected.

5. A data processing apparatus comprising:

a plurality of hierarchical control processing means which are configured as a hierarchy of data communication processing means and for individually performing the hierarchical control processing means corresponding to a level of the hierarchical data communication processing means, and a data transfer control processing means for controlling data transfer among the plurality of hierarchical control processing means, wherein each of the hierarchical control processing means:

accesses connection management information stored in a predetermined memory area to manage data to be processed in a connection of data communication processing;

detects an anomalous event in data during a data communication process;

sets another hierarchical control as a destination of transmitting the data and an anomaly indication in data transmission information when an anomalous event is detected in the data communication process;

sends the data transmission information including the destination and the anomaly indication to the data transfer control processing means;

detects whether or not an anomaly indication is included in a data transmission information received from the data transfer control processing means, and when the anomaly indication is detected in the received data transmission information, discards data which is to be processed in the connection corresponding to the data transmission information in which the anomaly indication is detected; and wherein the data transfer control processing means:

stores data transmission control information on the basis of the data transmission information received from the hierarchical control processing means;

detects whether or not the anomaly indication is included in the received data transmission information;

sets an anomaly indication in data transmission information when the anomaly indication is detected in the received data transmission information; and simultaneously transmits the data transmission information to the hierarchical control processing means except for the hierarchical control processing means in which a first data transmission information was sent to the data transfer control processing means.

6. A data processing apparatus according to claim 5, wherein in the data transfer control processing means, when the anomaly indication is detected in the received data transmission information, data to be processed and data transmission control information corresponding to the connection in which the anomalous event is detected are discarded.

* * * * *

UNITED STATES PATENT AND TRADEMARK OFFICE
CERTIFICATE OF CORRECTION

PATENT NO. : 7,028,227 B2 Page 1 of 1
APPLICATION NO. : 09/963717
DATED : April 11, 2006
INVENTOR(S) : Kyoya It is certified that error appears in the above-identified patent and that said Letters Patent is hereby corrected as shown below:

On the Title Page:

Insert Item (30) as follows:

--(30) Foreign Application Priority Data; April 27, 2001; (JP) 2001-131745--.

Signed and Sealed this

Twenty-ninth Day of August, 2006

JON W. DUDAS
*Director of the United States Patent and Trademark Office*